July 24, 1951 L. W. TRIPP 2,561,678
ENDLESS TRACK FOR VEHICLES
Filed Aug. 8, 1949 3 Sheets-Sheet 3

Inventor:
Leonard William Tripp;
By his attorneys,
Baldwin, Wight, & Prevost

Patented July 24, 1951

2,561,678

UNITED STATES PATENT OFFICE 2,561,678

ENDLESS TRACK FOR VEHICLES

Leonard William Tripp, South Ealing, London, England, assignor to Roadless Traction Limited, Hounslow, England, a company of Great Britain Application August 8, 1949, Serial No. 109,113
In Great Britain August 12, 1948

5 Claims. (Cl. 305—10)

This invention relates to endless tracks for vehicles and is applicable to tracks of the "locked girder" type.

The term "locked girder" when hereinafter used is defined by that type of endless track whose links are formed by interengaging abutments serving to prevent the laid portion of the track hinging into reverse curvature, and more particularly to cause the laid portion of the track to have a small positive curvature equivalent to a wheel of very large diameter (of the order for example of 20 or more feet).

Heretofore it has been customary to construct tracks of the above type for use with vehicles such e. g. as agricultural vehicles, with a plurality of plates having links welded thereto, said links being adapted when interlocked with each other to maintain the track in the form of a rigid or "locked" girder. When the ground surface conditions have been such to merit their employment, a spade lug has been bolted to each of a selected number of ground plates, said lugs serving to increase the adhesion of the track with the ground. In general practice a spade lug or spud has usually been bolted to every third ground plate and while this arrangement has provided an excellent track adhesion with the ground without any tendency of the space between the spuds becoming choked with mud or clay, it has not been entirely satisfactory, due in some degree to undesirable vibration set up when running over a hard surface.

The object of this invention is to provide a track which is of simple construction and relatively inexpensive to manufacture and which will suit all requirements of modern farming and yet will obviate the aforementioned vibration, and have other advantages hereinafter mentioned.

According to the invention an endless track of the locked girder type comprises pivoted links each carrying a transverse plate-like spud which in operation is directed edgewise to the ground.

The spuds of adjacent links may be of different transverse length, and preferably each link is formed of spaced-apart side plates having extensions to carry the spud which bridges the side plates. By this means the spud itself can serve to hold the side plates in structural spaced-apart relationship.

Figure 1:
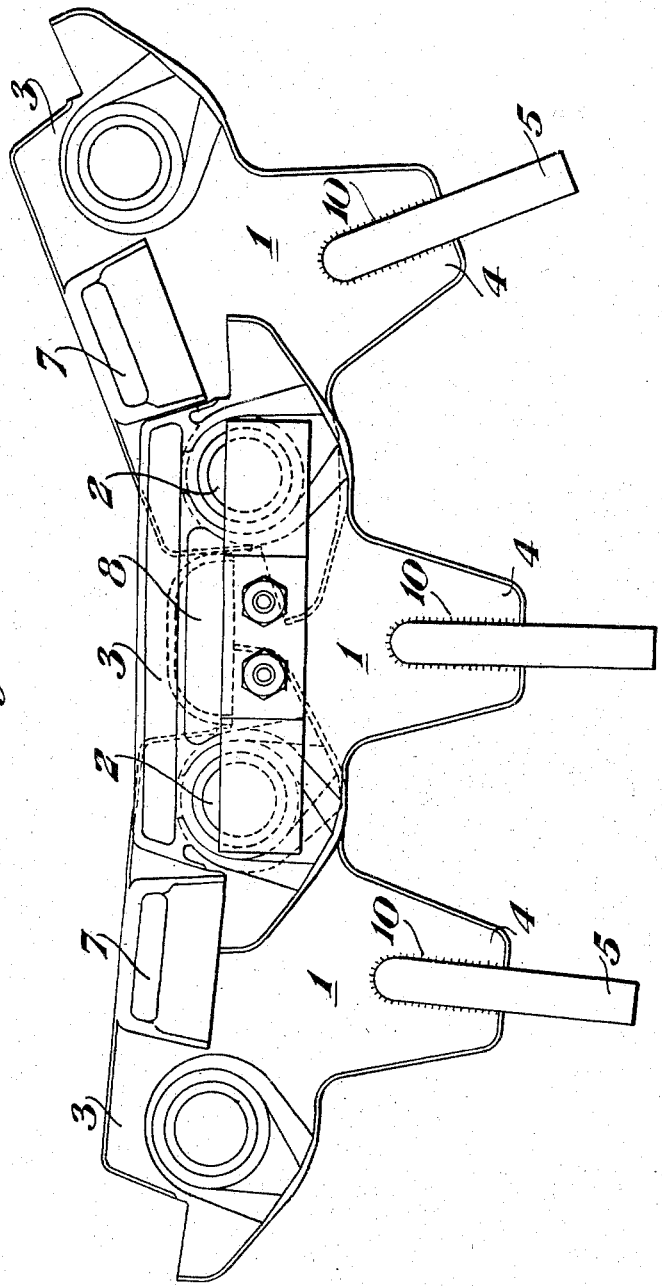
Figure 2:
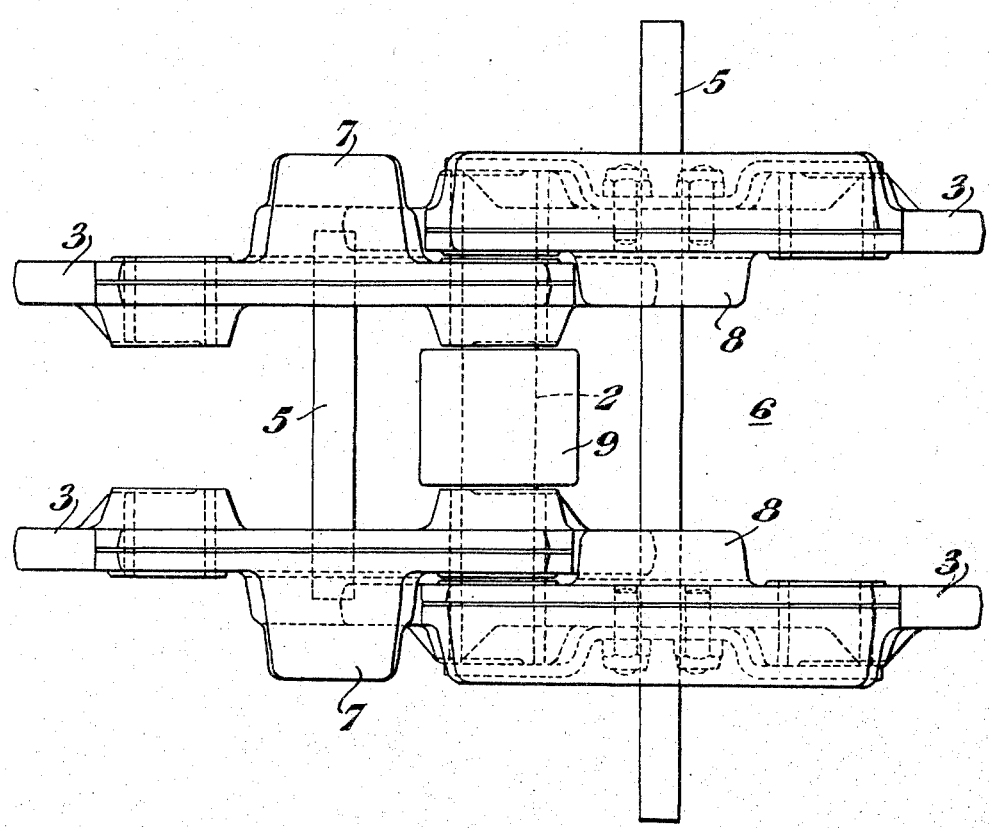
Figure 3:
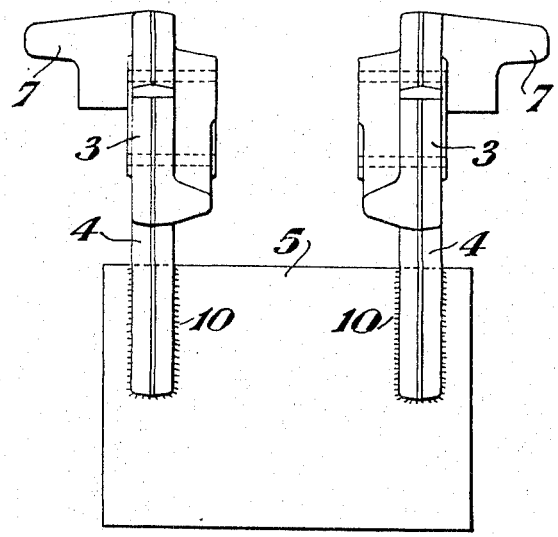
Figure 4:
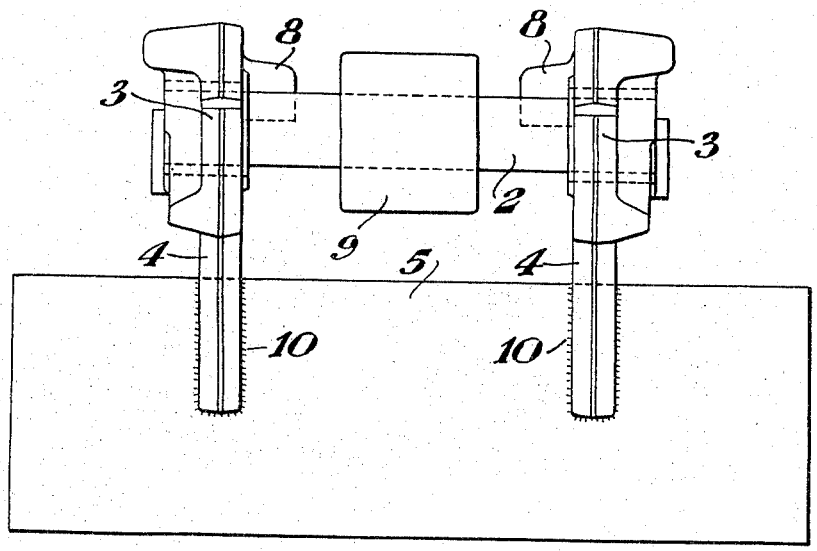

The invention is illustrated in the accompanying drawings in which Fig. 1 is a side elevation of a portion of the assembled track, Fig. 2 is a part plan view thereof, and Figs. 3 and 4 are front elevations of the two forms of link.

Referring to the drawings the endless track is built up with a plurality of links indicated generally at 1, pivotally connected together by means of pivot pins 2, each of said links being formed of side plates 3 each provided with an extension 4. These plates 3 are maintained in spaced relationship by a plate-like spud member 5 carried by each extension 4, the spud members being arranged transversely between the side plates 3 and being directed edgewise to the ground.

The side plates 3 of one of a pair of adjacent links 1 (see Fig. 3) are spaced a less distance apart than the other of the pair (see Fig. 4) so that the narrower spaced plates 3 project into the space 6 between the wider spaced plates; the narrower spaced plates 3 are formed with laterally outwardly projecting abutments 7 to be engaged by the wider spaced side plates, and these latter plates have inwardly projecting abutments 8 to be engaged by the narrower spaced plates 3.

Located on and disposed about each pivot pin 2 between the side plates 3 is a roller 9 (see Fig. 2), which rollers are provided for driving engagement with the teeth of the normally provided sprocket wheel (not shown).

Although the spuds 5 are shown in the drawings as being welded at 10 to the extensions 4 of the side plates 3 it will be appreciated that alternatively they may be bolted or riveted thereto.

It will be apparent that by so spacing adjacent links 1 the spuds 5 will be of different transverse lengths so that when the track is assembled the pairs of narrow spaced links 1 will be maintained apart by the spuds 5 of smaller transverse length the whole assembly thus providing an open or skeleton type of track such that if mud does tend to collect between the spuds 5 it not only readily falls out again but will be actually pushed out by the teeth of the sprocket wheel.

From the foregoing description it will readily be apparent that the invention possesses many advantages, one of which being that in the absence of ground plates there is no tendency for mud to accumulate in the channel formed between said plates and the links of previously known types of tracks due to the depth of the spuds, their spacing and the formation of the track as a whole.

Heretofore when a seed drill or transplanting machine has been drawn behind a vehicle fitted with an endless track having a plurality of ground plates, the passage of the vehicle over the surface of the seed bed has caused the ground plates to impress a shallow rut in the ground. This effect is most detrimental to good agricultural results in that the seeds or plants sown or placed in that portion of the ground where the rut has been formed are not sown at the same depth as those sown in the remaining portion of the seed bed, thus giving rise to non-uniform height of plants and retarded growth due to the compressed soil.

The present invention overcomes this difficulty as when the spuds, due to the travel of the track, are removed from the ground, the light soil of the seed bed immediately falls into the narrow slot left by the spuds.

I claim:

1. An endless track of the locked girder type comprising pivoted links, each of said links comprising spaced-apart side plates and a transverse plate-like spud secured to the said side plates and serving as the sole means of holding the said plates in their spaced-apart relationship, the said spud in operation being directed edgewise to the ground.

2. An endless track of the locked girder type comprising pivoted links, each of said links comprising spaced-apart side plates having extension portions, and a transverse plate-like spud secured in said extension portions so as to form a bridge between the said side plates and so as to act as the sole means of holding the said side plates in their spaced-apart relationship, the said spud being in operation directed edgewise to the ground.

3. An endless track of the locked girder type comprising pivoted links, each of said links comprising spaced-apart side plates having extension portions, and a transverse plate-like spud secured in said extension portions so as to form a bridge between the said side plates and so as to act as the sole means of holding the said side plates in their spaced-apart relationship, the said spud being in operation directed edgewise to the ground, the said spuds of adjacent links being of different transverse length.

4. An endless track of the locked girder type as claimed in claim 2 in which the side plates of one of a pair of adjacent links are spaced less apart than those of the other of the pair so that the former side plates project into the space between the latter.

5. An endless track of the locked girder type as claimed in claim 3 in which the side plates of one of a pair of adjacent links are spaced less apart than those of the other of the pair so that the former side plates project into the space between the latter.

LEONARD WILLIAM TRIPP.

REFERENCES CITED

The following references are of record in the file of this patent:

UNITED STATES PATENTS

| Number | Name | Date |
|---|---|---|
| 484,827 | Stewart | Oct. 25, 1892 |
| 1,297,844 | Hatfield | Mar. 18, 1919 |
| 1,413,099 | Cox | Apr. 18, 1922 |
| 1,587,097 | White | June 1, 1926 |
| 1,704,857 | Henneuse | Mar. 12, 1929 |

FOREIGN PATENTS

| Number | Country | Date |
|---|---|---|
| 136,815 | Great Britain | Dec. 9, 1919 |